April 29, 1941.                     M. WINTERHALTER                     2,239,803
                                    SLIDING CLASP FASTENER
                                    Filed Aug. 28, 1936

Inventor:
Martin Winterhalter,
By S. Sollal,
atty.

Patented Apr. 29, 1941

2,239,803

UNITED STATES PATENT OFFICE 2,239,803

SLIDING CLASP FASTENER

Martin Winterhalter, Morcote-Castello, near Lugano, Switzerland

Application August 28, 1936, Serial No. 98,308
In Germany April 6, 1935

3 Claims. (Cl. 24—205)

This invention relates to an improvement in sliding clasp fasteners, and particularly relates to the type in which the interlocking members are molded on and intimately united to the opposite sides of the stringers.

One of the objects of the invention is to provide a device of this character in which the interlocking projections and recesses of the interlocking members are free of mold flash, so that the projections will be fully seated in the recesses and not spaced therefrom by mold flash.

A further object of my invention is to securely fasten the shank members of the interlocking members to the stringers and thereby prevent movement of the interlocking members relative to the stringers.

The precise nature of my invention will be best understood by reference to the accompanying drawing, in which.

Figure 1:
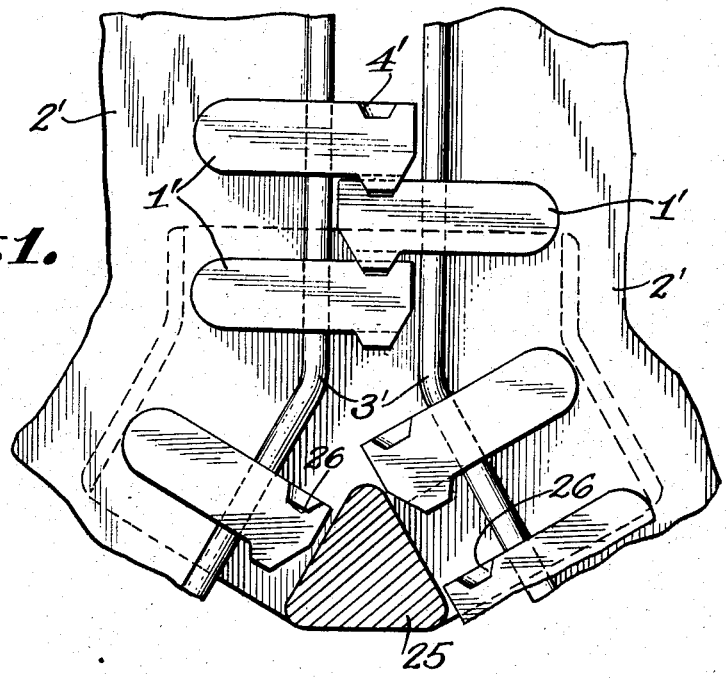
Figure 1 is a bottom plan view of one form of my invention.

Referring to the accompanying drawing, the reference character 2' designates the stringers, which are provided with a thickened portion 3', at the edge thereof and 1' designates the interlocking members molded on the stringers. 25 designates a slider adapted to interlock and disengage the interlocking members on adjacent stringers.

These interlocking members are molded preferably by an apparatus clearly illustrated and described in my Patent No. 2,184,265, December 19, 1939, the application of which is a division of this application.

In the molding of the interlocking members 1' on the stringers, the shank members 27 and 28 are molded on opposite sides of the stringers.

Figure 2:
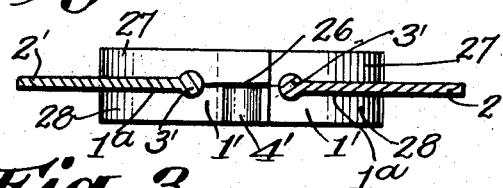
Fig. 2 is a transverse sectional view only through the stringers.
Figure 3:
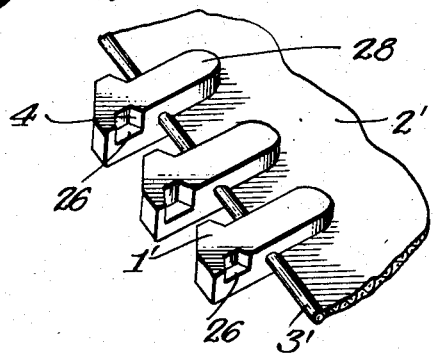
Fig. 3 is a perspective view of a portion of a stringer and several interlocking members thereon.

The locking projections and the recesses 4' in the interlocking members, are formed in one part of the mold, so that the bottoms 26 of the recesses are in the plane of the stringer. This forming of the recesses 4' and the locking projections in one part of the mold and in the plane of the stringers so that any mold flash which is formed will be along the lines 1a, as clearly shown in Figs. 2 and 3. This forming of the mold flash along the lines 1a, will avoid the forming of any mold flash across the recesses or the locking projections, so that the locking projections can be fully seated in their receiving recesses.

As the interlocking members are molded on the stringers they are secured throughout the entire area of the surface engagement of the interlocking members and stringers.

I claim:

1. A sliding clasp fastener comprising a pair of stringers, a plurality of spaced interlocking members molded on and intimately united to opposite sides of each stringer and having portions extending beyond the stringers, said interlocking members each having a projection on a face of the extending portion and a recess in the opposite face, the recesses in the members on one stringer being arranged to receive the projections on the members on the other stringer to lock the stringers together, each recess having a bottom in a plane substantially parallel with its stringers, the mold flash formed on the members being substantially parallel to the stringers and in the plane of the bottoms of the recesses, so that the interlocking projections and recesses are free of mold flash.

2. A sliding clasp fastener comprising a pair of stringers, a plurality of spaced interlocking members molded on and intimately united to opposite sides of each stringer and having portions extending beyond the stringers, said interlocking members having a projection on a face of the extending portion and a recess in the opposite face, the recesses in the members on one stringer being arranged to receive the projections on the members on the other stringer to lock two stringers together, the bottoms of each recess having a bottom in the plane of its stringers, the mold flash formed on the members during molding being in the plane of the stringers and the bottoms of the recesses, so that the interlocking projections and recesses are free of mold flash.

3. A sliding clasp fastener comprising a pair of stringers adapted to lie approximately in the same plane, a plurality of spaced members molded on and intimately united to opposite sides of each stringer and having portions extending beyond the stringers, the series of extending portions of the members on one stringer adapted to intermesh with that on the other, and means for interlocking the extending portions of said members on one stringer with those on the other comprising a projection molded on each face of a series of corresponding faces of the extending portions of the members on one stringer and cooperating recesses for receiving said projections molded in the adjacent faces of the projecting portions of said members on the other stringer, which recesses have bottoms in a plane substantially parallel to said stringers, the mold flash formed on the members being substantially parallel to the stringers and in the plane of the bottoms of said recesses, so that said mold flash does not interfere with the reception of said projections by said recesses.

MARTIN WINTERHALTER.